Oct. 19, 1971  E. L. McDONALD  3,613,153
TENDON PULLING MACHINE
Filed Feb. 2, 1970  3 Sheets-Sheet 3
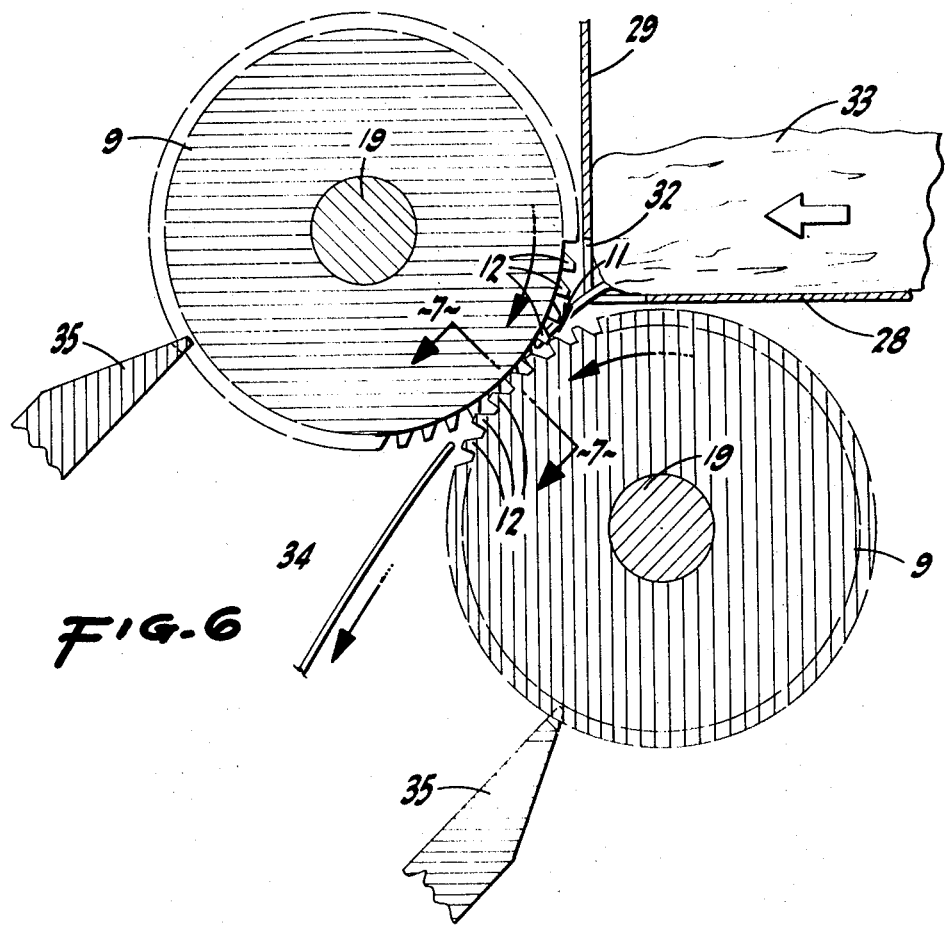
FIG.-6
FIG.-7
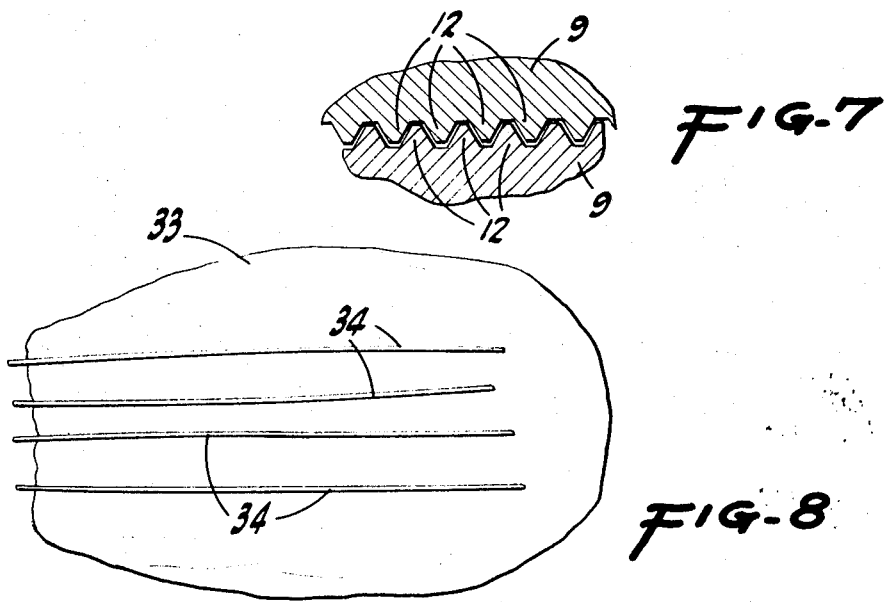
FIG.-8

# United States Patent Office 3,613,153
Patented Oct. 19, 1971

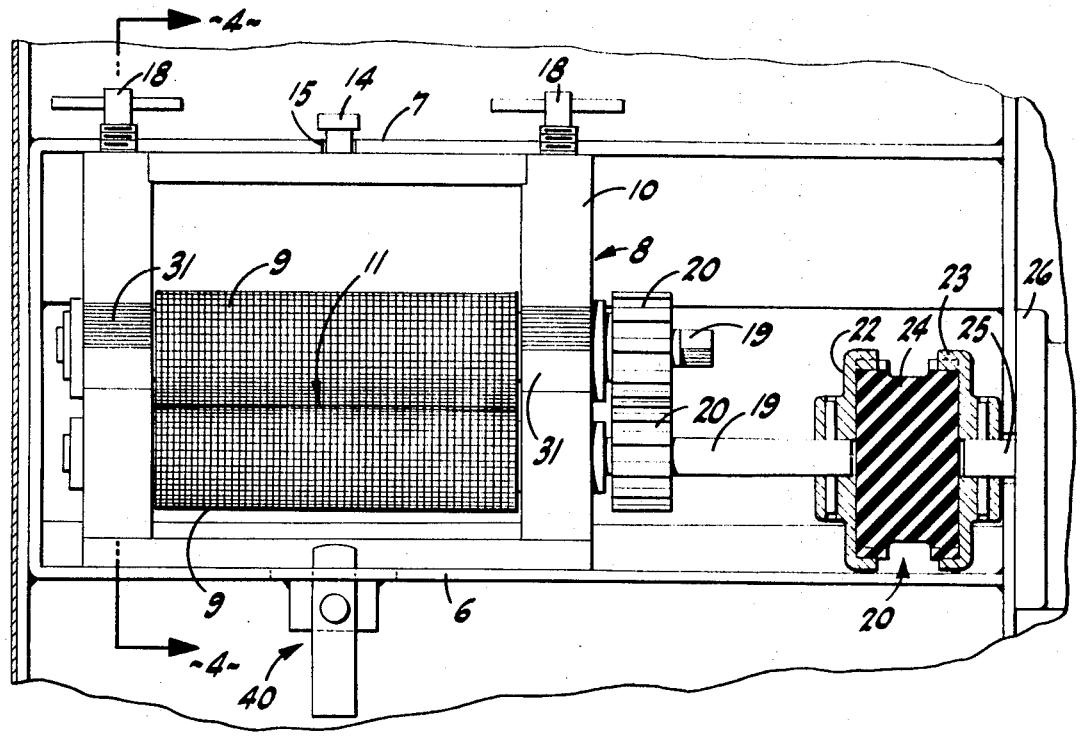
FIG. 3
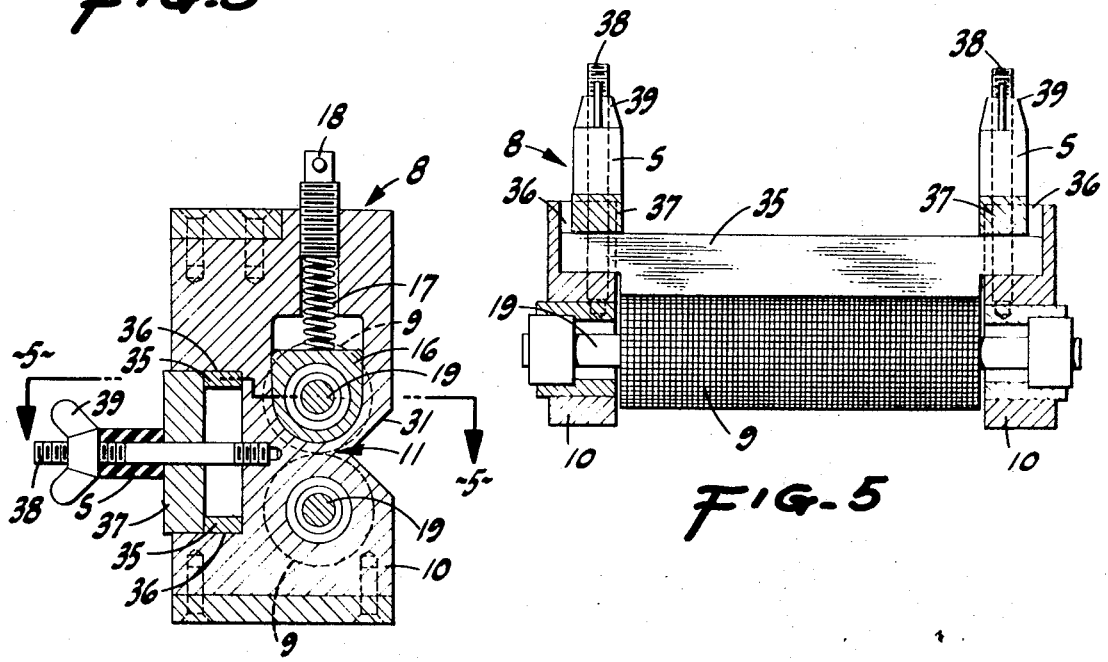
FIG. 4
FIG. 5

3,613,153
TENDON PULLING MACHINE
Emery L. McDonald, Cupertino, Calif., assignor of a fractional part interest to Anthony J. Volk, Turlock, Calif.
Filed Feb. 2, 1970, Ser. No. 7,951
Int. Cl. A22c 21/00
U.S. Cl. 17—11.3      7 Claims

ABSTRACT OF THE DISCLOSURE

A machine, for pulling the tendons from deboned leg meat of poultry, comprising essentially a pair of toothed, parallel rolls—in the nature of pinch rolls—running in meshing engagement and driven in opposition so that such rolls turn on one side toward the line of engagement, or pinch line, thereof; there being a guard plate overlying such one side of the rolls, and the guard plate having a row of relatively short slots therethrough closely adjacent and parallel to said pinch line. The deboned leg meat, in the form of a substantially flat piece, is pressed against the guard plate in a position such that end portions of the tendons project through the slots and to the pinch line of the rolls, whereupon the latter grasp such tendons and forcefully pull them out of the leg meat; the latter being restrained or held back from the rolls by the guard plate.

BACKGROUND OF THE INVENTION

In the poultry industry, particularly in the manufacture of turkey products prepared from parts of the fowl, the legs are cut and deboned in a fashion which produces a substantially flat piece of meat with the long, tough, bone-like tendons remaining therein. These tendons must be removed before use of the piece of meat, and heretofore this has commonly been done by hand and which was a time-consuming, and hence costly, operation. The present invention was conceived in the course of efforts seeking a more facile way of removing the tendons.

SUMMARY OF THE INVENTION

The present invention provides, as a major object, a power driven machines which, while fed by hand, is operative to mechanically and forcefully grasp and pull the tendons from a substantially flat piece of deboned leg meat of poultry, while preventing masceration of such meat.

The present invention provides, as another object, a machine wherein the pulling of the tendons from the piece of leg meat is accomplished by a pair of toothed, parallel rolls running in meshing engagement and driven in opposition so as to turn on one side toward the pinch line of said rolls; there being a guard plate overlying such one side of the rolls, and the guard plate having a row of relatively short slots therethrough closely adjacent and parallel to said pinch line. The substantially flat piece of deboned leg meat is pressed against the guard plate in a position such that end portions of the tendons project through the slots and to the pinch line of the rolls, whereupon the latter grasp such tendons and forcefully pull them out of the leg meat; the guard plate, in the area surrounding the slots, serving as a stop which holds back the leg meat and maintains it clear of the rolls during the tendon-pulling operation.

The present invention provides, as an additional object, a machine—as in the preceding paragraph—wherein the pair of cooperating, tendon-pulling rolls and associated parts are carried as a unit on a supporting frame; such unit being manually quick-removable from the machine for cleaning and sterilization after use.

The present invention provides, as a further object, a tendon-pulling machine which is designed for ease and economy of manufacture, and convenience of use.

The present invention provides, as a still further object, a practical, reliable, and durable tendon-pulling machine and one which is exceedingly effective for the purpose for which it is designed.

BRIEF DESCRIPTION OF THE DRAWINGS

FIG. 3 is an enlarged, fragmentary top view, showing the tendon-pulling unit, on substantially line 3—3 of FIG. 2.
FIG. 4 is a fragmentary transverse vertical section on substantially line 4—4 of FIG. 3.
FIG. 5 is a fragmentary plan view on substantially line 5—5 of FIG. 4.
FIG. 6 is an enlarged, fragmentary, transverse vertical section of the cooperating rolls and the adjacent guard plate of tendon-pulling unit as in use.
FIG. 7 is fragmentary sectional view, showing the tooth-engagement of the cooperating rolls, on substantially line 7—7 of FIG. 6.
FIG. 8 is a plan view of one of the flat pieces of deboned leg meat, with the tendons as initially present therein.

DESCRIPTION OF THE PREFERRED EMBODIMENT

Figure 1:
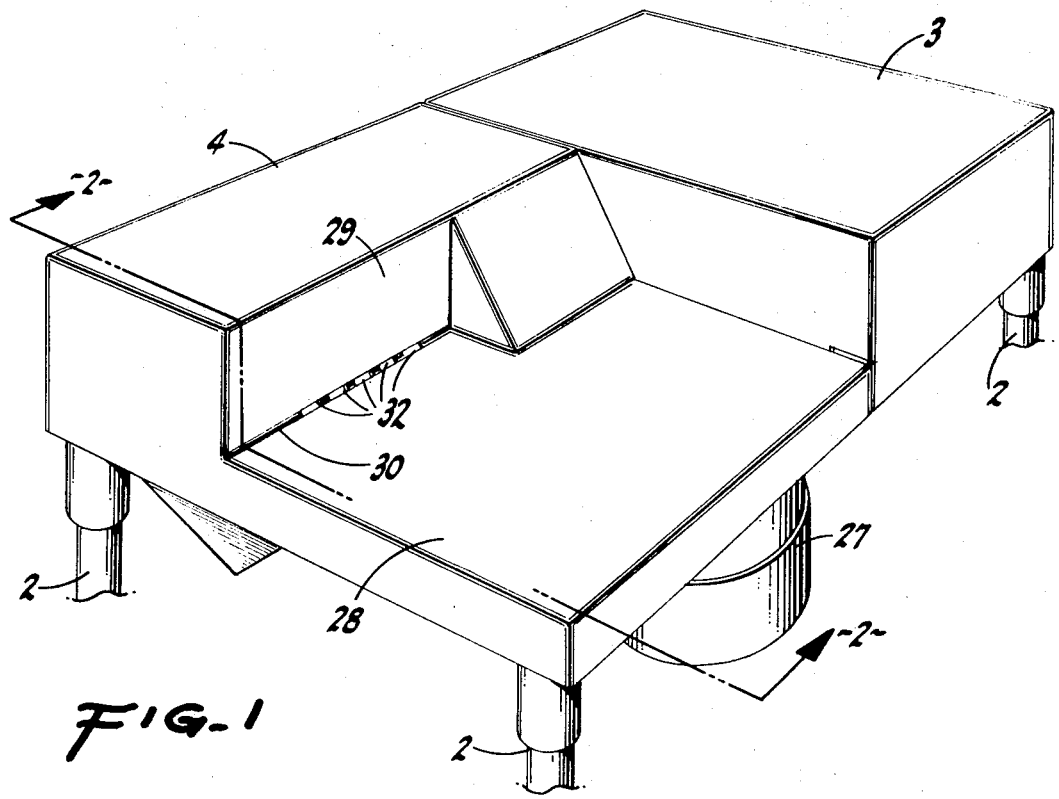
FIG. 1 is a perspective view of the machine.
Figure 2:
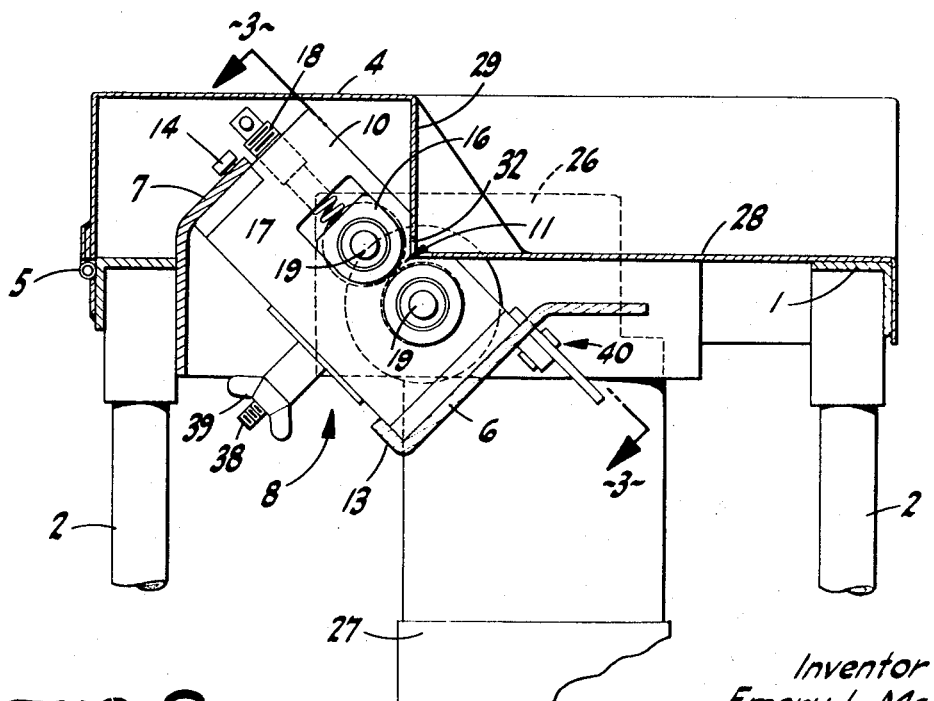
FIG. 2 is a transverse vertical section on substantially line 2—2 of FIG. 1.

Referring now mor particularly to the drawings and to the characters of reference marked thereon, the machine comprises an open, horizontal frame 1 of rectangular form; such frame being supported at table height by corner legs 2. The right-hand portion of the frame 1 is enclosed by a permanent hood 3, while the left-hand portion of such frame is normally enclosed by a separate hood 4 back-edge hinged, as at 5, for upward and rearward swinging from a normally lowered or closed position to a raised or open position.

Within the left-hand portion of the machine, below the normally closed hood 4, there are two longitudinal supporting bars 6 and 7 disposed in spaced relation in a front-to-rear direction; the front supporting bar 6 being, in general, in a horizontal plane somewhat lower than the back supporting bar 7.

A tendon-pulling unit, indicated generally at 8, is removably supported by the bars 6 and 7 in a position adjacent the left-hand end of the frame 1; such unit being constructed as follows:

A pair of longitudinally extending, toothed, parallel rolls 9 are journaled in—and span between—opposite ends of a relatively small, open, rectangular carrier frame 10; such rolls being toothed and running in meshing engagement at a pinch line 11.

The teeth 12 are alined both in longitudinal and circumferential rows on each roll, with the individual rows on one roll running between adjacent rows on the other roll. The individual teeth are of the form illustrated, in enlargement, in FIGS. 6 and 7.

The roll carrier frame 10 is supported—in removable relation, and at an upward and rearward incline—from the bars 6 and 7 by a stop flange 13 on bar 6 which is engaged by the lower back edge of said frame 1, and a central locator stud 14 which upstands from the top of such frame 10 and is received in an open-ended notch 15 in the upper edge of bar 7. As so mounted, the tendon-pulling unit 8 can be readily placed in and subsequently quick-removed from the machine.

The uppermost one of the rolls 9 is journaled, at its ends, in slide blocks 16 movably mounted in the ends of the roll carrier frame 10; such slide blocks 16 being urged by springs 17 (loaded by adjustable screws 18) in a direction which yieldably maintains the rolls 9 in proper meshing engagement.

The shafts 19, of the rolls 9, project beyond the laterally inner end of the roll carrier frame 10, and are there fitted with gears 20 which run in mesh. One shaft 19, elongated as shown, is connected to a horizontal axis coupling, indicated generally at 21. This coupling 21 is of the separable type and includes opposed, axially spaced, internally toothed cups 22–23 normally interconnected by a rubber, peripherally toothed drive body 24 detachably seated in matching relation in and spanning between the cups 22–23.

The coupling 21 is driven, from the end opposite the elongated shaft 19, by an axially alined shaft 25 powered from a right-angle gear box 26 actuated by an electric motor 27.

With the above described drive system, and upon operation of the electric motor 27, the rolls 9 are simultaneously driven but in opposite directions; the rolls, on the front side, both turning toward the pinch line 11.

When the machine is in operation, the hingedly mounted hood 4 is in lowered or closed position, and at which time the tendon pulling unit 8 is covered by such hood. The hood 4 includes a horizontal plate 28 which merges at its rear edge with the lower edge of a vertical back plate 29; the line of merger, indicated at 30, extending lengthwise of the machine directly in front of the tendon-pulling unit 8 very close and parallel to (but slightly spaced from) the pinch line 11 of the rolls 9. In order to matchingly accommodate—in engagement—the adjacent right-angle portions defined by the horizontal plate 28 and vertical back plate 29, the ends of the roll carrier frame are notched as at 31. Such notching also serves to dispose the line of merger 30 close and parallel to the pinch line 11 as desirable and as above described.

A row of relatively short slots 32 is formed, along the line of merger 30, in the adjacent parts of horizontal plate 28 and vertical back plate 29; such row of slots 32 being disposed adjacent and directly in front of the rolls 9 and closely paralleling the pinch line 11 thereof, yet slightly spaced therefrom whereby plates 28 and 29 remain clear of the rolls 9.

In use of the described machine, with the hood 4 in lowered position and rolls being driven, a deboned leg meat of poultry—in the form of a flat piece 33—is placed on horizontal plate 28 and pressed against back plate 29 in a position such that projecting ends of the tendons 34 in the meat extend through the slots 32 and to the pinch line 11. At such moment, the rolls 9 grip the tendons 34 and forcefully pull them out of the piece of meat 33; the latter being restrained or held back by the back plate 29 which—together with the adjacent part of plate 28—acts as a guard or stop plate. Consequently, the piece of meat 33 cannot be drawn into engagement with and mascerated by the rolls 9. The tendons 34, after being pulled from the piece of meat, are discharged rearwardly from the rolls 9 for reception in a suitable container.

In order to prevent clogging of the toothed rolls 9, each is engaged on the back side and in meshing relation by a longitudinal comb 35; the combs being disposed at the ends in slots 36 in the roll carrier frame 10, and held in place by spanner bars 37 yieldably urged inward by rubber sleeves S on threaded studs 38, with the sleeves held under load by wing nuts 39 on such studs.

In order to remove the tendon-pulling unit 8 for cleaning and sterilization, it is only necessary, after releasing a swing latch 40, to grasp and lift the unit 8 upward while simultaneously shifting said unit slightly laterally in a direction to cause separation of the coupling 21; the unit 8 then being wholly free for removal from the machine.

From the foregoing description, it will be readily seen that there has been produced such a tendon pulling machine as substantially fulfills the objects of the invention, as set forth herein.

While this specification sets forth in detail the present and preferred construction of the tendon pulling machine, still in practice such deviations from such detail may be resorted to as do not form a departure from the spirit of the invention as defined by the appended claims.

I claim:

1. A machine, for pulling tendons from a flat piece of deboned leg meat of poultry, comprising a carrier frame, means supporting the carrier frame in a predetermined position, a pair of parallel axis rolls journaled in the carrier frame and engaging to provide a pinch line, means to simultaneously drive the rolls in opposite directions so that on one side they turn toward the pinch line, a guard plate covering the rolls on such one side thereof, a portion of such guard plate being immediately adjacent and parallel to the pinch line of the rolls but clear of the latter, and such portion of the guard plate being slotted to form a row of end-to-end slots; such row of slots extending parallel to the pinch line whereby, upon the piece of meat being pressed against the guard plate in a position which projects the tendons through the slots, the tendons are grasped by the rolls at the pinch line and pulled out of the piece of meat.

2. A machine, as in claim 1, in which the carrier frame is manually removable from the supporting means therefor, and the drive means for the rolls includes a coupling which of itself separates upon such removal of the carrier frame.

3. A machine, as in claim 2, in which the drive means for the rolls includes axial shafts, and meshing gears on the shafts beyond one end of said rolls; one such shaft being extended beyond the related gear and connected to the separable coupling.

4. A machine, as in claim 1, in which the slots of the row are each relatively short.

5. A machine, for pulling tendons from a flat piece of deboned leg meat of poultry, comprising a carrier frame, means supporting the carrier frame in a predetermined position, a pair of parallel axis rolls journaled in the carrier frame and engaging to provide a pinch line, means to simultaneously drive the rolls in opposite directions so that on one side they turn toward the pinch line, a guard plate covering the rolls on such one side thereof, a portion of such guard plate being closely adjacent and parallel to the pinch line of the rolls but clear of the latter, and such portion of the guard plate being slotted parallel to the pinch line whereby, upon the piece of meat being pressed against the guard plate in a position which projects the tendons through the slotted portion of said guard plate, the tendons are grasped by the rolls at the pinch line and pulled out of the piece of meat; said slotted portion of the guard plate including a substantially horizontal plate section and a substantially vertical plate section each extending from a longitudinal line of merger; the slotting being along said line of merger.

6. A machine, for pulling tendons from a flat piece of deboned leg meat of poultry, comprising a carrier frame, means supporting the carrier frame in a predetermined position, a pair of parallel axis rolls journaled in the carrier frame and engaging to provide a pinch line, means to simultaneously drive the rolls in opposite directions so that on one side they turn toward the pinch line, a guard plate covering the rolls on such one side thereof, a portion of such guard plate being closely adjacent and parallel to the pinch line of the rolls but clear of the latter, and such portion of the guard plate being slotted parallel to the pinch line whereby, upon the piece of meat being pressed against the guard plate in a position which projects the tendons through the slotted portion of said guard plate, the tendons are grasped by the rolls at the pinch line and pulled out of the piece of meat; said slotted portion of the guard plate being of substantially right-angle form in the radial plane of the rolls, and the slotting being along the corner line of said portion of the guard plate.

7. A machine, as in claim 1, including a main frame, the supporting means for the carrier frame being included in said main frame, and the drive means embodying an electric motor mounted on such main frame; the carrier frame being manually removable from said supporting means, and the drive means including a separable coupling between the electric motor and the carrier frame; said coupling separating upon such removal of the carrier frame.

References Cited

UNITED STATES PATENTS

| | | | |
|---|---|---|---|
| 1,737,225 | 11/1929 | Dunner | 17—11.1 R |
| 2,313,770 | 3/1943 | Ringrose | 17—11.1 R |
| 1,218,174 | 3/1917 | Faint | 17—11.1 R |
| 2,690,588 | 10/1954 | Hillsen, Sr. | 17—11.3 |

LUCIE H. LAUDENSLAGER, Primary Examiner